US011418256B1

(12) United States Patent
Mellon et al.

(10) Patent No.: US 11,418,256 B1
(45) Date of Patent: Aug. 16, 2022

(54) BROADCAST FREE SPACE OPTICAL COMMUNICATIONS VIA DIFFUSION

(71) Applicant: The United States of America, as represented by the Secretary of the Navy, San Diego, CA (US)

(72) Inventors: Samuel Nicholas Mellon, Charleston, SC (US); Robert Alexander Younts, Moncks Corner, SC (US); Robert R. Regal, Charleston, SC (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/318,177

(22) Filed: May 12, 2021

(51) Int. Cl.
*H04B 10/112* (2013.01)
*H04B 10/11* (2013.01)
*H04B 10/524* (2013.01)
*H04B 10/50* (2013.01)

(52) U.S. Cl.
CPC ........... *H04B 10/11* (2013.01); *H04B 10/503* (2013.01); *H04B 10/524* (2013.01); *H04B 2210/252* (2013.01)

(58) Field of Classification Search
CPC ................ H04B 10/11–116; H04B 10/524
See application file for complete search history.

(56) References Cited

U.S. PATENT DOCUMENTS

| 7,796,885 | B2 | 9/2010 | Dress | |
|---|---|---|---|---|
| 8,081,876 | B2 | 12/2011 | Dress | |
| 8,977,135 | B2 | 3/2015 | Xia | |
| 2002/0131123 | A1* | 9/2002 | Clark | H04B 10/1125 398/118 |
| 2004/0264972 | A1* | 12/2004 | Killinger | H04B 10/1141 398/130 |

(Continued)

FOREIGN PATENT DOCUMENTS

| DE | 69735357 | 10/2006 | |
|---|---|---|---|
| FR | 3048572 | * 8/2017 | ........... H04B 10/112 |
| WO | 97/37445 | 10/1997 | |

OTHER PUBLICATIONS

Malik, Aditi, et al., Free Space Optics: Current Applications and Future Challenges International Journal of Optics. 2015.

(Continued)

*Primary Examiner* — Nathan M Cors
(74) *Attorney, Agent, or Firm* — Naval Information Warfare Center, Pacific; Kyle Eppele; James McGee

(57) ABSTRACT

An optical communication system includes a transmitter and at least one receiver employing a feature of an outdoor environment, or includes a transmitter and a receiver in each of multiple transceivers employing a respective or shared feature of the outdoor environment. The transmitter includes a laser emitting a beam of laser pulses having a wavelength. The transmitter encodes data into the laser pulses in the beam, and transmits the beam of laser pulses through free space of the outdoor environment and then onto a feature of the outdoor environment. Each receiver includes a line filter blocking light not having the wavelength. The receiver decodes data from the light that passes through the line filter and includes a diffusion of the beam from the feature.

16 Claims, 2 Drawing Sheets

(56) References Cited

U.S. PATENT DOCUMENTS

2020/0280829 A1\* 9/2020 Benefield ................ H04W 4/46
2021/0273405 A1\* 9/2021 Neil ...................... H02J 7/0068

OTHER PUBLICATIONS

Najafi, Marzieh, et al., Intelligent Reflecting Surfaces for Free Space Optical Communications. arXiv:1905.01094v1 [cS.IT] 2019.
Cao, Zizheng, et al., Reconfigurable beam system for non-line-of-sight free-space optical communication. Light Science & Applications 8:69 (2019).
Budinger, J. M., et al., Quarternary Pulse Position Modulation Electronics for Free-Space Laser Communications NASA Technical Memorandum 104502, AIAA-91-3471 (1991).
Vorontsov, M. A., et al., Bit Error Rate in Free-Space Optical Communication Systems with a Partially Coherent Transmitting Beam. Atmospheric and Oceanic Optics. 26:3 (2013) pp. 185-189.

\* cited by examiner

BROADCAST FREE SPACE OPTICAL COMMUNICATIONS VIA DIFFUSION

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 113258.

BACKGROUND OF THE INVENTION

Wireless communications have an advantage that infrastructure, such as wires, is not needed in the space between the intercommunicating nodes. This enables easy communication between transmitting and receiving nodes even when the nodes are mobile. However, wireless communications also have disadvantages including that the wireless communications are blocked by obstructions, and the achievable communication bandwidth is limited in the crowded radio-frequency spectrum.

SUMMARY

An optical communication system includes a transmitter and at least one receiver. The transmitter includes a laser emitting a beam of laser pulses having a wavelength. The transmitter encodes data into the laser pulses in the beam, and transmits the beam of laser pulses through free space of the outdoor environment and then onto a feature of the outdoor environment. Each receiver includes a line filter blocking light not having the wavelength. The receiver decodes the data from the light that passes through the line filter and via the free space includes a diffusion of the beam from the feature. The diffusion of the beam from the feature preferably broadcasts the beam from the feature of the outdoor environment.

An optical communication system includes multiple transceivers, which employ a shared feature of an outdoor environment. Each transceiver includes a transmitter, a receiver, and an arbitrator. The transmitter includes a laser emitting a beam of laser pulses having a wavelength. The transmitter encodes data into the laser pulses in the beam, and transmits the beam of laser pulses onto the shared feature of the outdoor environment. The receiver includes a line filter blocking light not having the wavelength. The receiver decodes data from the light that passes through the line filter and includes a diffusion from the shared feature of the beam from the transmitter of another of the transceivers. The arbitrator allocates access to the shared feature of the outdoor environment. The arbitrator implements an allocation scheme, such as time-division multiple access, code-division multiple access, and orthogonal frequency division multiple access dynamically controlling the wavelength of the laser of the transmitter and the wavelength of the line filter of the receiver. The diffusion of the beam from the feature preferably broadcasts the beam from the shared feature of the outdoor environment.

An optical communication system includes multiple transceivers. Each transceiver employs a respective feature of an outdoor environment and includes a transmitter and a receiver. The transmitter includes a laser emitting a beam of laser pulses having a wavelength. The transmitter encodes data into the laser pulses in the beam, and transmits the beam of laser pulses onto the respective feature of the outdoor environment. The receiver includes a line filter blocking light not having the wavelength. The receiver decodes data from the light that passes through the line filter and includes a diffusion from the respective feature of the beam from the transmitter of another of the transceivers. The diffusion of the beam from the feature preferably broadcasts the beam from the respective feature of the outdoor environment

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other systems and methods described herein as will be understood by one of ordinary skill in the art unless otherwise stated specifically.

Various embodiments of the invention provide wireless communications that readily bypass obstructions and do not use the crowded radio-frequency spectrum. In one embodiment, this is achieved with an infrared or visible laser beam that illuminates a feature of the outdoor environment, and then the feature of the outdoor environment diffusely broadcasts the laser beam in all directions. With appropriate selection or active positioning of the diffusing feature, the wireless communications readily bypass any obstructions in the outdoor environment.

Figure 1:
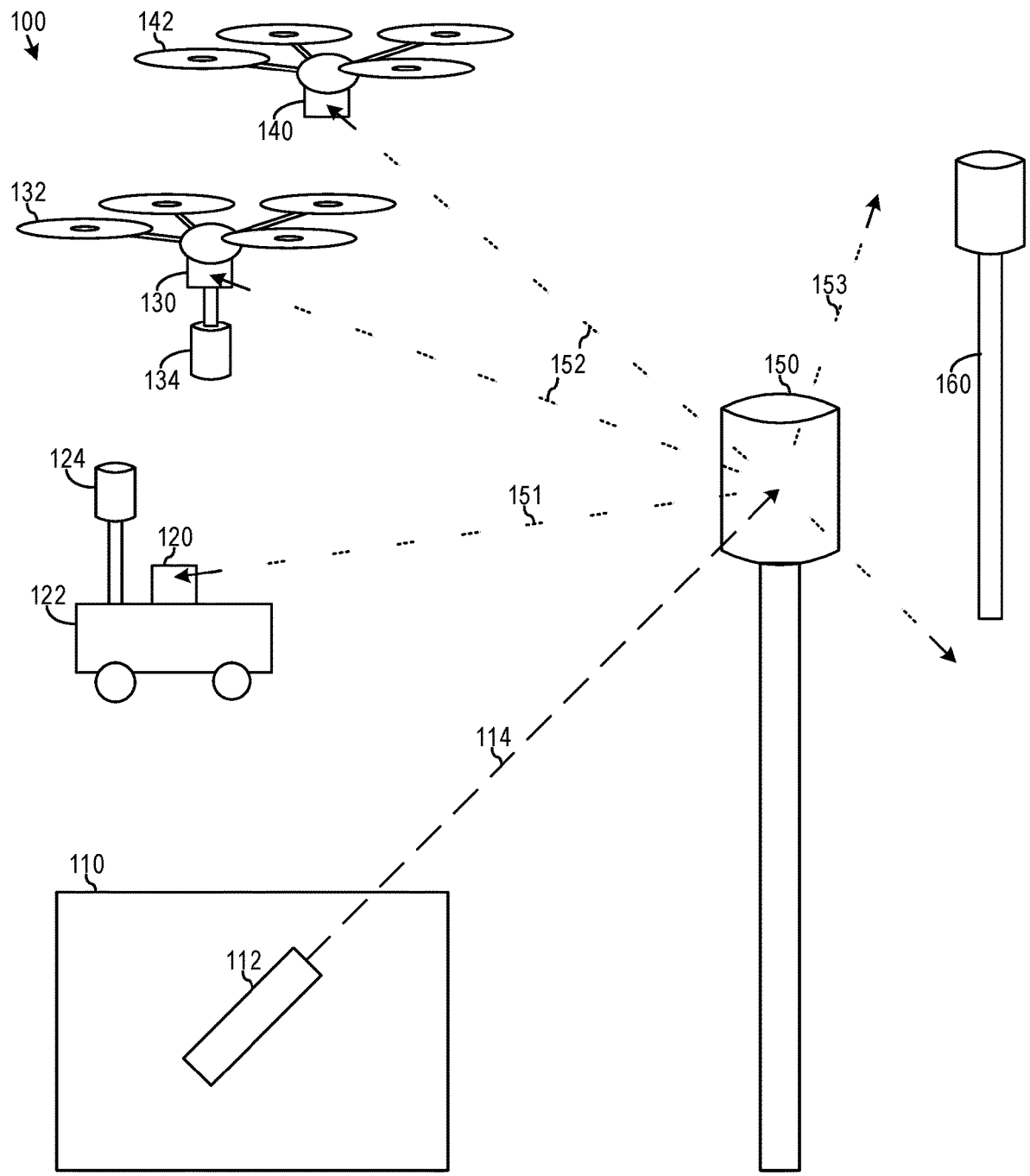
FIG. 1 and FIG. 2 are optical communication systems in accordance with various embodiments of the invention.

FIG. 1 is an optical communication system 100 in accordance with an embodiment of the invention. The optical communication system includes a transmitter 110 and receivers 120, 130, and 140. The transmitter 110 includes a laser 112 for emitting a beam 114 of laser pulses having a wavelength. The transmitter 110 is adapted to encode data into the laser pulses in the beam 114. In one example, the transmitter encodes the data into respective time intervals between the laser pulses in the beam 114, and the time interval between two adjacent pulses is relatively short or relatively long to encode a value of zero or one for a data bit. In another example, the transmitter encodes the data into pulse widths of the laser pulses in the beam 114, and each the pulse width is relatively short or relatively long to encode a value of zero or one for a data bit. In yet another example, the transmitter encodes the data into on-off keying of the laser pulses in the beam 114. Typically, the beam 114 has a wavelength in infrared or visible, and the beam 114 has a short duty cycle for the laser pulses of less than 1:1000.

The transmitter 110 is adapted to transmit the beam 114 of laser pulses through free space of the outdoor environment and then onto a feature 150 of the outdoor environment. The feature 150 of the outdoor environment is a natural feature, an artificial feature of opportunity, or an artificial diffusor designed to produce a diffusion. The diffusion of the beam 114 from feature 150 includes one or more of diffuse reflection 151, back scattering 152, and forward scattering 153. Example natural features for feature 150 include rock, soil, foliage, snow, rain, and a cloud. Clouds include fog and mist. Example artificial features of opportunity for feature 150 include a building, a tower 160, a bridge, an overpass, pavement, a contrail, smoke, a land vehicle 122, an airborne vehicle 142, and an aquatic vehicle, such as amphibious land vehicle 122. A feature is a feature of opportunity when the feature is disposed by happenstance at a position enabling communication between transmitter 110 and receivers 120, 130, and 140. In one example, paint accidentally scraped off land vehicle 122 leaves a rough surface that is more diffuse than specular for feature 150. In another example, billowing smoke from a natural or accidental forest fire is the feature 150 enabling communication with a receiver carried by each firefighter combatting the forest fire, the communication enabled despite terrain that blocks radio communications.

An artificial diffusor is designed to produce the diffusion when the artificial diffusor is disposed at a prescribed location in the outdoor environment specifically to produce the diffusion, and/or the artificial diffusor is designed for directionally diffusing the beam 114 over a range of angles. For example, feature 150 is designed to produce a diffusion that uniformly broadcasts the beam 114 in all directions regardless of the direction of the incoming beam 114. In another example, airborne vehicle 142 itself becomes the feature 150 when airborne vehicle 142 is moved to hover above a location halfway between the transmitter 110 and the receiver 120. Although airborne vehicle 142 is a generic aircraft in this example, in another example an artificial diffusor is affixed to a support at the prescribed location in the outdoor environment, such as airborne vehicle 132 modified to carry an artificial diffusor 134 that becomes the feature 150 when airborne vehicle 132 is positioned to enable communication between transmitter 110 and the receiver 120. In other examples, an artificial diffusor is affixed or embossed on a natural feature of the outdoor environment, a building, a tower 160, a bridge, an overpass, pavement, a land vehicle 122 with artificial diffusor 124, and an aquatic vehicle.

Each of the receivers 120, 130, and 140 includes a line filter for blocking light not having the wavelength of the beam 114. Each of the receivers 120, 130, and 140 is adapted to decode the data from the light that passes through the line filter. This light passing through the line filter includes the diffusion (diffuse reflection 151, back scattering 152, or forward scattering 153) of the beam 114 from the feature 150. In one embodiment, the receivers 120, 130, and 140 concurrently decode the data encoded in transmitter 110.

Figure 2:
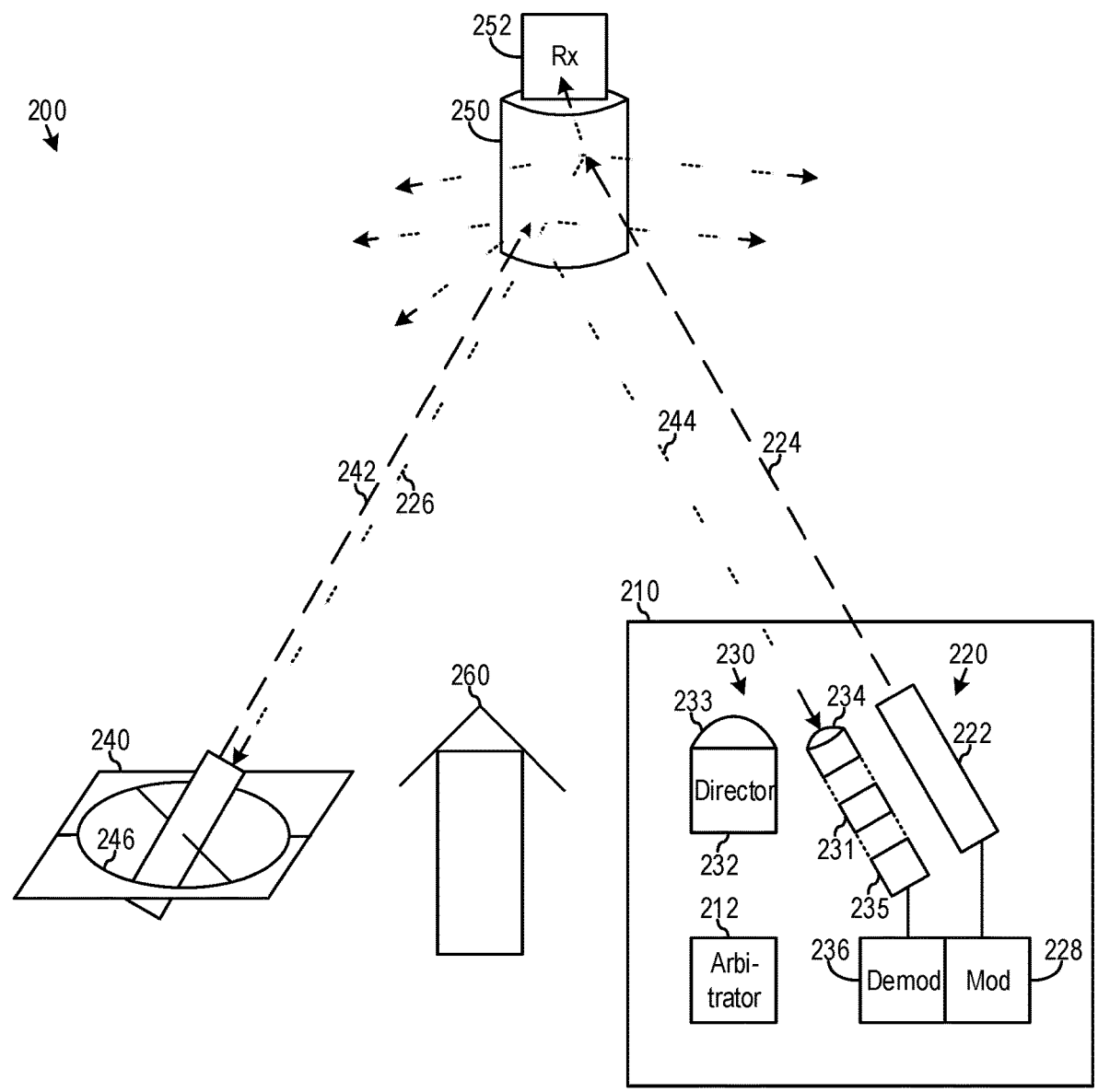

FIG. 2 is an optical communication system 200 in accordance with an embodiment of the invention. The optical communication system 200 includes transceivers 210 and 240 that employ a feature 250 of an outdoor environment.

The transceiver 210 includes a transmitter 220 and a receiver 230. The transmitter 220 includes a laser 222 for emitting a beam 224 of laser pulses having a wavelength. The transmitter 220 is adapted to encode data into the laser pulses in the beam 224. The transmitter 220 is adapted to transmit the beam 224 of laser pulses onto a feature 250 of the outdoor environment.

The receiver 230 includes a line filter 231 for blocking light not having the wavelength. The receiver 230 is adapted to decode data from the light that passes through the line filter 231 and includes a diffusion 244 from the feature 250 in the outdoor environment of the beam 242 from the transmitter of another of the transceivers, such as transceiver 240.

In one embodiment, the transmitter 220 further includes a modulator 228 for encoding the data in the laser pulses in the beam 224. In one example, modulator 228 is an electronic shutter, such as an acousto-optic modulator or electro-optic modulator, modulating a beam output from laser 222. In another example, laser 222 is a Q-switching laser, and modulator 228 controls the gating of the Q-switch to control the laser pulses of the beam 224.

Transceivers 210 and 240 have the same type or different types. When transceivers 210 and 240 have the same type, transceivers 210 and 240 show different aspects of this same type in FIG. 2. Transceiver 240 includes a gimbal 246 of a director for aiming the beam 242 along a line-of-sight between the transmitter of transceiver 240 and the feature 250 of the outdoor environment. Transceiver 240 uses gimbal 246 for actively tracking any movement of feature 250 while compensating for movement and rotation of transceiver 240. Transceiver 210 includes a similar director 232 for aiming the beam 224 along a line-of-sight between the transmitter 220 of transceiver 210 and the feature 250.

Frequently, transceivers 210 and 240 are disposed in the outdoor environment so that an obstruction 260 blocks a direct line-of-sight between transceivers 210 and 240. Thus, a direct line-of-sight does not exist between the transmitter of transceiver 240 and the receiver 230 of transceiver 210, and a direct line-of-sight does not exist between the transmitter 220 of transceiver 210 and the receiver of transceiver 240. However, the beam 242 traverses a direct line-of-sight between the transmitter of transceiver 240 and the feature 250, and a respective portion of the diffusion 244 of the beam 242 traverses a direct line-of-sight between the feature 250 and the receiver 230 of transceiver 210. Similarly, the beam 224 traverses a direct line-of-sight between the transmitter 220 of transceiver 210 and the feature 250, and a respective portion of the diffusion 226 of the beam 224 traverses a direct line-of-sight between the feature 250 and the receiver of transceiver 240.

Thus, the receiver 230 is adapted to decode the data from the light, which includes the respective portion of the diffusion 244 of the beam 242, but does not include the beam 242 directly received from the transmitter of transceiver 240, and the receiver of transceiver 240 is adapted to decode the data from the light, which includes the respective portion of the diffusion 226 of the beam 224, but does not include the beam 224 directly received from the transmitter 220 of transceiver 210.

In one embodiment, the receiver 230 of transceiver 210 further includes a wide-angle sensor 233 for determining a direction of a line-of-sight between the feature 250 and the receiver 230 of transceiver 210. For example, wide-angle sensor 233 includes a fish-eye lens, a line filter like line filter 231, and a camera sensor having a two-dimensional grid of sensor pixels. A bright pixel indicates the direction of a line-of-sight to a feature 250 illuminated by the beam 242 and producing a diffusion 244 towards the transceiver 210.

Various techniques can amplify the apparent brightness of such bright pixels. In one example, ambient background illumination is detected and subtracted with another line filter having a slightly wider passband using another camera sensor. In another example, an electronic shutter for the camera sensor briefly opens for a duration matching a pulse width of the laser pulses in the beam 242, and the electronic shutter opens at a rate that is a delta frequency deviation from the frequency of the laser pulses in the beam 242. So operated, the electronic shutter produces aliasing at a prescribed aliasing frequency corresponding to the delta frequency deviation. If the camera sensor is sampled at a rate more than twice the aliasing frequency, then electronic filtering, which passes the aliasing frequency within the output of the camera sensor, dramatically amplifies the apparent brightness of the bright pixels by a factor corresponding to the typically 1:1000 or shorter duty cycle of the laser pulses in the beam 242. Such aliasing also helps synchronize the receiver with the transmitter's laser pulses and helps select a feature 250 that does not temporally blur the laser pulses during the diffusion from the feature 250.

In one embodiment, the receiver 230 of transceiver 210 further includes a narrow-angle optics 234, such as a gimbaled telescope, for receiving the light that includes the diffusion 244 of the beam 242 from the feature 250. The director 232 aims both the narrow-angle optics 234 and the laser 222 in the direction of the feature 250. A detector 235 detects the laser pulses in the diffusion 244 of the beam 242 within the light received by the narrow-angle optics 234 and passing through the line filter 231. The line filter 231 has a passband sufficient to encompass the bandwidth of the modulation of the beam 242 with the laser pulses, and sufficient to encompass any Doppler shift arising from relative movement among the transceiver 240, the feature 250, and the transceiver 210. The receiver 230 of transceiver 210 further includes a demodulator 236 for decoding the data from the laser pulses detected by the detector 235.

For example, the feature 250 of the outdoor environment is an artificial diffusor designed to directionally diffuse the beam 224 incoming to the artificial diffusor as a function of angles among an orientation of the artificial diffusor, the beam 224 incoming from the transmitter 220 to the artificial diffusor, and the diffusion 226 of the beam 224 outgoing from the artificial diffusor toward each receiver, such as the receiver of transceiver 240. The diffusion over the function of the angles ranges between nearly specular to the orientation and fully diffusive. In addition, an additional receiver 252 is disposed at the prescribed location of the artificial diffusor of the feature 250 and includes an additional line filter for blocking light not having the wavelength. The additional receiver 252 is adapted to decode the data from the light that passes through the additional line filter and includes the beam 224 or the diffusion of the beam 224 from the feature 250. The artificial diffusor is controllable to change the orientation of the artificial diffusor, such as an orientation of a diffuse reflective surface of the artificial diffusor of feature 250, in response to the data decoded in the additional receiver 252.

In one embodiment, optical communication system 200 further includes the feature 250 introduced at a prescribed location in the outdoor environment specifically to produce the diffusions 226 and 244 of the beams 224 and 242. For example, a jet aircraft flies through the outdoor environment and leaves a contrail at a prescribed location with the contrail becoming the feature 250. If conditions are not conducive to formation of a contrail, an aircraft alternatively releases an aerosol becoming the feature 250. In another example, a flare shot into the sky leaves a smoke trail that becomes the feature 250. Such a contrail, aerosol, or smoke trail produces a small forward scattering in certain embodiments, so that the beams 224 and 242 are scattered by small acute angles many times, which totally randomizes the direction of the diffusions 226 and 244 after many such small scattering events. This uniformly broadcasts the diffusions 226 and 244.

It will be appreciated that the optical communication system 200 includes many more transceivers than the two transceivers 210 and 240 shown in FIG. 2 in certain embodiments, and these many transceivers share feature 250 or employ multiple such features. For example, these transceivers of optical communication system 200 are partitioned into intercommunicating groups, with the transceivers in each intercommunicating groups sharing a respective feature of the outdoor environment. Thus, the data encoded by the transmitter of each transceiver in the intercommunicating group becomes the data decoded by the receiver of each transceiver in the intercommunicating group. FIG. 2 shows an example of such an intercommunicating group of two transceivers 210 and 240 sharing feature 250. Another intercommunicating group might have the same structure as shown in FIG. 2, but be unable to communicate with the transceivers of other groups via the laser beams. However, a complete communication network is formed because certain transceivers in the intercommunicating groups are further interconnected via wired or wireless links.

In one embodiment, the transceiver 210 further includes an arbitrator 212. The arbitrator 212 allocates access to the shared feature 250 of the outdoor environment. The arbitrator 212 implements an allocation scheme, such as time-division multiple access, code division multiple access, and orthogonal frequency division multiple access dynamically controlling the wavelength of the laser 222 of the transmitter 220 and the wavelength of the line filter 231 of the receiver 230.

From the above description of the Broadcast Free Space Optical Communications via Diffusion, it is manifest that various techniques may be used for implementing the concepts of systems 100 and 200 without departing from the scope of the claims. The described embodiments are to be considered in all respects as illustrative and not restrictive. The apparatus/method disclosed herein may be practiced in the absence of any element that is not specifically claimed and/or disclosed herein. It should also be understood that system 100 or 200 is not limited to the particular embodiments described herein, but is capable of many embodiments without departing from the scope of the claims.

We claim:
1. An optical communication system comprising:
an artificial diffusor disposed at a prescribed location in an outdoor environment and designed to directionally diffuse a beam incoming to the artificial diffusor within a range between nearly fully diffusive and nearly specular to an orientation of the artificial diffusor;
a transmitter including a laser for emitting the beam of laser pulses having a wavelength, wherein the transmitter is adapted to encode data into the laser pulses in the beam, and the transmitter is adapted to transmit the beam of laser pulses through free space of the outdoor environment and then onto the artificial diffusor in the outdoor environment;
at least one first receiver each including a line filter for blocking light not having the wavelength, wherein the first receiver is adapted to decode the data from the light that passes through the line filter and via the free space includes a diffusion of the beam from the artificial diffusor; and
a second receiver including an additional line filter for blocking the light not having the wavelength, wherein the second receiver is adapted to decode the data from the light that passes through the additional line filter and includes the beam, and the second receiver is disposed at the prescribed location for changing the orientation of the artificial diffusor in response to the data decoded in the second receiver.

2. The optical communication system of claim 1, wherein:
the wavelength is infrared or visible, and a duty cycle of the laser pulses is less than 1:1000, and
the diffusion of the beam includes one or more of diffuse reflection, back scattering, and forward scattering from the artificial diffusor in the outdoor environment.

3. The optical communication system of claim 1, wherein the artificial diffusor in the outdoor environment is designed to produce the diffusion.

4. The optical communication system of claim 1, wherein the artificial diffusor in the outdoor environment is an artificial feature of opportunity selected from the group consisting of a contrail, smoke, a land vehicle, an airborne vehicle, and an aquatic vehicle.

5. The optical communication system of claim 1, wherein the artificial diffusor is designed to directionally diffuse the beam incoming to the artificial diffusor as a function of angles among the orientation of the artificial diffusor, the beam incoming from the transmitter to the artificial diffusor, and the diffusion of the beam outgoing from the artificial diffusor to each of the at least one first receiver, with the diffusion over the function of the angles ranging between nearly specular to the orientation and fully diffusive.

6. The optical communication system of claim 1, wherein the artificial diffusor is disposed at the prescribed location in the outdoor environment specifically to produce the diffusion of the beam included in the light that passes through the line filter of the first receiver.

7. The optical communication system of claim 6, wherein the artificial diffusor is affixed to a support at the prescribed location in the outdoor environment, the support selected from the group consisting of a natural feature of the outdoor environment, a building, a tower, a bridge, an overpass, pavement, a land vehicle, an airborne vehicle, and an aquatic vehicle.

8. The optical communication system of claim 7, wherein:
the artificial diffusor is designed to directionally diffuse the beam incoming to the artificial diffusor as a function of angles among the orientation of the artificial diffusor, the beam incoming from the transmitter to the artificial diffusor, and the diffusion of the beam outgoing from the artificial diffusor to each of the at least one first receiver, with the diffusion over the function of the angles ranging between nearly specular to the orientation and fully diffusive, and
the artificial diffusor is controllable to change the orientation of the artificial diffusor in response to the data decoded in the second receiver.

9. The optical communication system of claim 1, wherein the artificial feature is selected from the group consisting of a contrail, an aerosol, and smoke, wherein the artificial feature is introduced at the prescribed location in the outdoor environment specifically to produce the diffusion of the beam included in the light that passes through the line filter of the first receiver.

10. The optical communication system of claim 1, wherein:
the transmitter and each specific receiver of the at least one first receiver are disposed in the outdoor environment so that a direct line-of-sight does not exist between the transmitter and the specific receiver,
the beam traverses a direct line-of-sight between the transmitter and the artificial diffusor in the outdoor environment, and, for each specific receiver of the at least one first receiver, a respective portion of the diffusion of the beam traverses a direct line-of-sight between the artificial diffusor in the outdoor environment and the specific receiver, and
for each specific receiver of the at least one first receiver, the specific receiver is adapted to decode the data from the light, which includes the respective portion of the diffusion of the beam and does not include the beam directly received from the transmitter.

11. The optical communication system of claim 10, wherein the diffusion diffuses the beam incoming to the artificial diffusor over a range of angles relative to the incoming beam.

12. The optical communication system of claim 1, wherein the at least one first receiver is a plurality of first receivers, each specific receiver in the plurality adapted to receive a respective portion of the diffusion of the beam along a direct line-of-sight from the artificial diffusor to the specific receiver, and the first receivers are adapted to concurrently decode the data from the light that, at each of the first receivers, passes through the line filter and includes the respective portion of the diffusion from the artificial diffusor broadcasting the beam.

13. The optical communication system of claim 1, wherein:
the transmitter is adapted to encode the data into respective time intervals between the laser pulses in the beam, each of the respective time intervals between two adjacent ones of the laser pulses is relatively short or relatively long to encode a bit of the data as having a value of zero or one, and
the first receiver is adapted to decode the data from the respective time intervals between the laser pulses in the diffusion of the beam within the light that passes through the line filter.

14. The optical communication system of claim 1, wherein:
the transmitter is adapted to encode the data into pulse widths of the laser pulses in the beam, each of the pulse widths is relatively short or relatively long to encode a bit of the data as having a value of zero or one, and
the first receiver is adapted to decode the data from the pulse widths of the laser pulses in the diffusion of the beam within the light that passes through the line filter.

15. An optical communication system comprising:
a transmitter including:
a laser for emitting a beam of laser pulses having a wavelength,
a modulator for encoding data in the laser pulses in the beam, and
a director for aiming the beam along a line-of-sight between the transmitter and a feature of an outdoor environment, and for transmitting the laser pulses of the beam through free space of the outdoor environment and then onto the feature of the outdoor environment; and
at least one receiver each including:
a wide-angle sensor for determining a direction of a line-of-sight between the feature and the receiver,
a narrow-angle optics for receiving light that via the free space includes a diffusion of the beam from the feature, the director also for aiming the narrow-angle optics in the direction of the feature,
a line filter for blocking the light not having the wavelength, a detector for detecting the laser pulses in the diffusion of the beam within the light received by the narrow-angle optics and passing through the line filter, and a demodulator for decoding the data from the laser pulses detected by the detector.

16. An optical communication system comprising a plurality of transceivers, which employ a shared feature of an outdoor environment, and each transceiver of the transceivers includes:

a transmitter including a laser for emitting a beam of laser pulses having a wavelength, wherein the transmitter is adapted to encode data into the laser pulses in the beam, and the transmitter is adapted to transmit the beam of laser pulses onto the shared feature of the outdoor environment;

a receiver including a line filter for blocking light not having the wavelength, wherein the receiver is adapted to decode data from the light that passes through the line filter and includes a diffusion from the shared feature of the beam from the transmitter of another of the transceivers; and an arbitrator for allocating access to the shared feature of the outdoor environment, the arbitrator implementing an allocation scheme selected from the group consisting of time-division multiple access, code-division multiple access, and orthogonal frequency division multiple access dynamically controlling the wavelength of the laser of the transmitter and the wavelength of the line filter of the receiver.

\* \* \* \* \*